United States Patent [19]

Klaus

[11] Patent Number: 4,628,829
[45] Date of Patent: Dec. 16, 1986

[54] SOLID FUEL COMBUSTION ASSEMBLY

[76] Inventor: Günter Klaus, Hoyerbergweg 26, Lindau (B), Fed. Rep. of Germany, 8990

[21] Appl. No.: 686,715

[22] Filed: Dec. 27, 1984

[51] Int. Cl.⁴ .............................................. F23N 5/18
[52] U.S. Cl. ............................ 110/186; 110/101 CD; 110/235; 110/302
[58] Field of Search ............... 110/235, 254, 242, 248, 110/256, 101 CD, 186, 302, 308

[56] References Cited

U.S. PATENT DOCUMENTS 4,470,358  9/1984  Prochnow ............................ 110/254

FOREIGN PATENT DOCUMENTS 656472   1/1963  Canada ................................ 110/235
2446989  9/1980  France ................................ 110/235

Primary Examiner—Edward G. Favors
Attorney, Agent, or Firm—Louis E. Marn

[57] ABSTRACT

There is disclosed an improved solid fuel combustion assembly including a combustion chamber having a high heat capacity liner and provided with primary and secondary combustion supporting fluid conduits to thereby achieve combustion temperatures in the combustion chamber of from 1000° C. to 1200° C.

9 Claims, 10 Drawing Figures

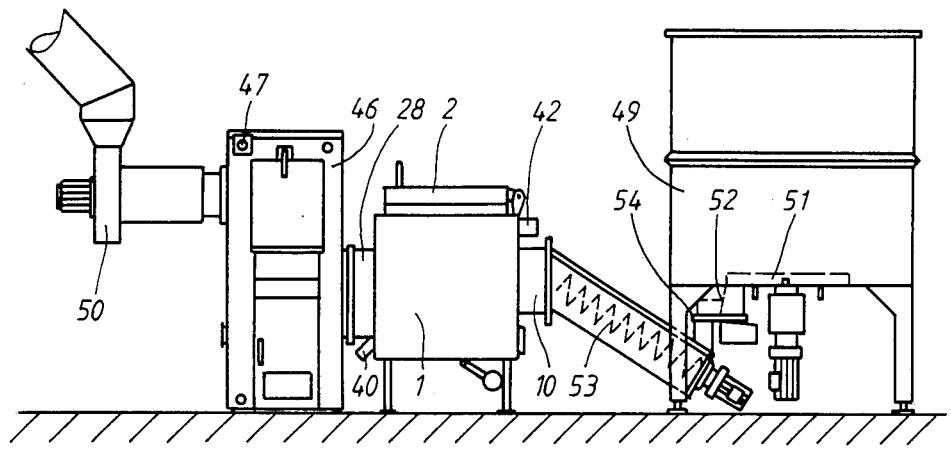
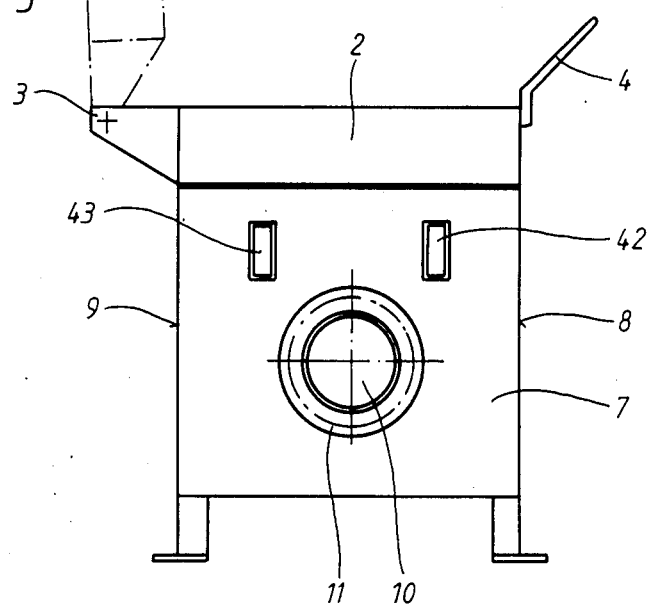

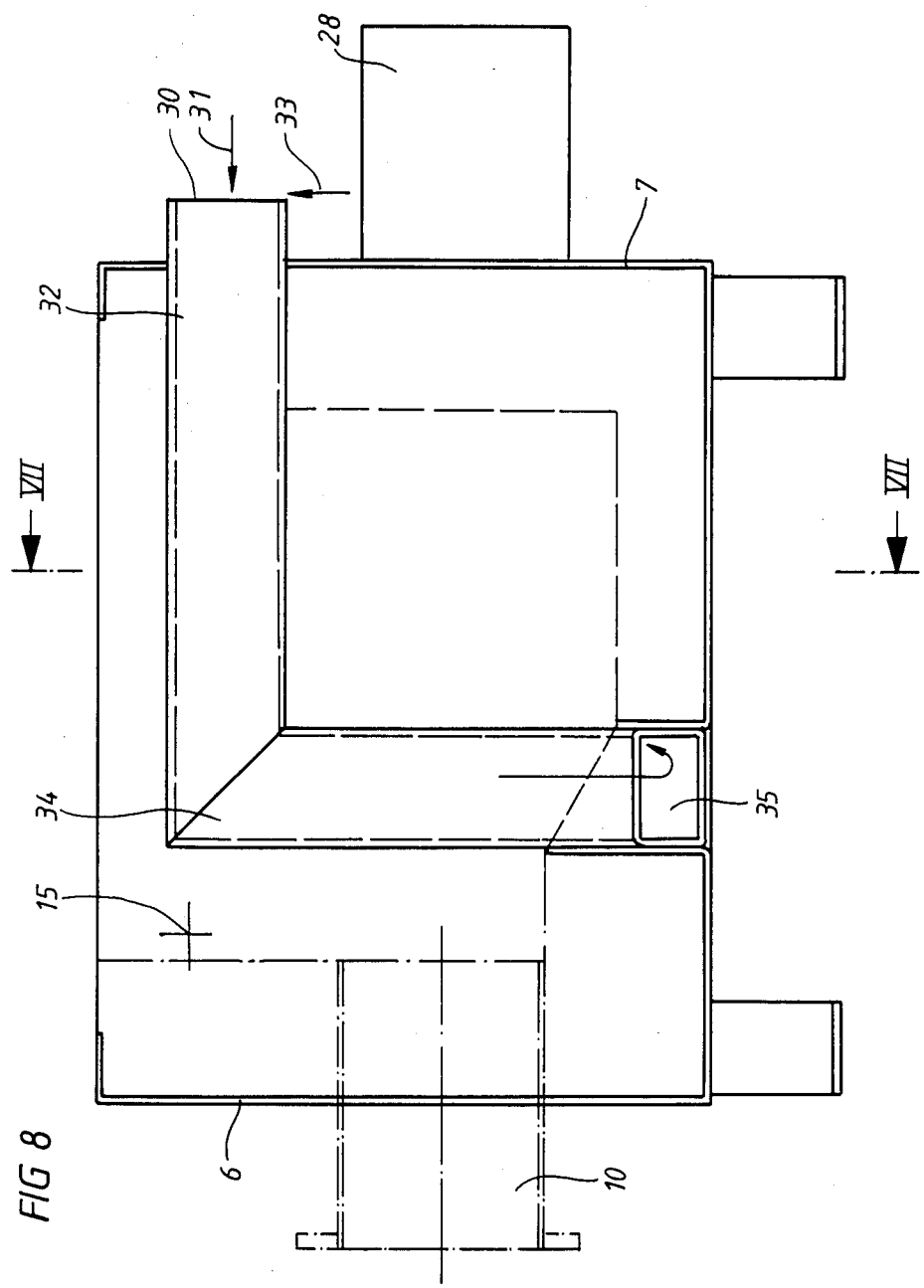

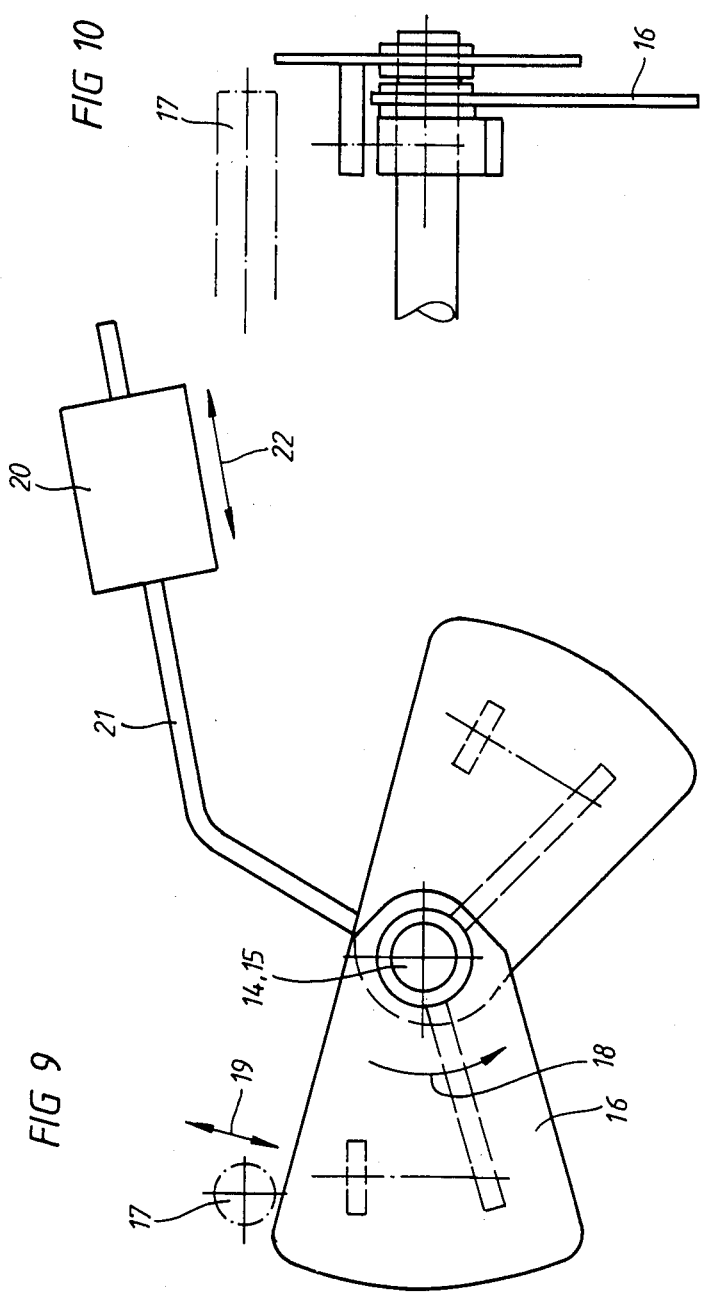

4,628,829

SOLID FUEL COMBUSTION ASSEMBLY

BACKGROUND OF THE INVENTION

1. Field of the Invention

This invention relates to a solid fuel combustion assembly, and more particularly to an improved solid fuel combustion assembly including a combustion chamber having a high heat capacity liner and improved flow of combustion supporting medium.

2. Description of the Prior Art

Combustion assemblies for burning solid fuels have been used for many years and generally suffer from a common problem, i.e. insufficient combustion of the solid fuel is achieved as a result of relatively low combustion temperatures. Insufficient combustion results in high levels of particulate matter as well as high levels of noxious gases.

OBJECTS OF THE INVENTION

An object of the present invention is to provide an improved solid fuel combustion assembly.

Another object of the present invention is to provide an improved solid fuel combustion assembly effecting combustion at relatively higher temperatures and thus greater efficiencies.

Still another object of the present invention it to provide an improved solid fuel combustion assembly substantially reducing or eliminating particulate matter and noxious gases.

SUMMARY OF THE INVENTION

These and other objects of the present invention are achieved by an improved solid fuel combustion assembly including a combustion chamber having a high heat capacity liner and provided with primary and secondary combustion supporting fluid conduits to thereby achieve combustion temperatures in the combustion chamber of from 1000° C. to 1200° C.

BRIEF DESCRIPTION OF THE DRAWINGS

A better understanding of the present invention as well as other objects and advantages thereof will become apparent upon consideration of the detailed description thereof, especially when taken with the accompanying drawings, wherein:

FIG. 1 is an elevational view of a somewhat schematic flow diagram including the improved solid fuel combustion assembly of the present invention;

FIG. 3 is an end view of the feed inlet side of the improved solid fuel combustion assembly;

FIG. 8 is a vertical section through the improved solid fuel combustion assembly;

FIG. 9 is an elevational view of the control assembly; and

FIG. 10 is a side view of the control assembly.

DETAILED DESCRIPTION OF THE INVENTION

Figure 2:
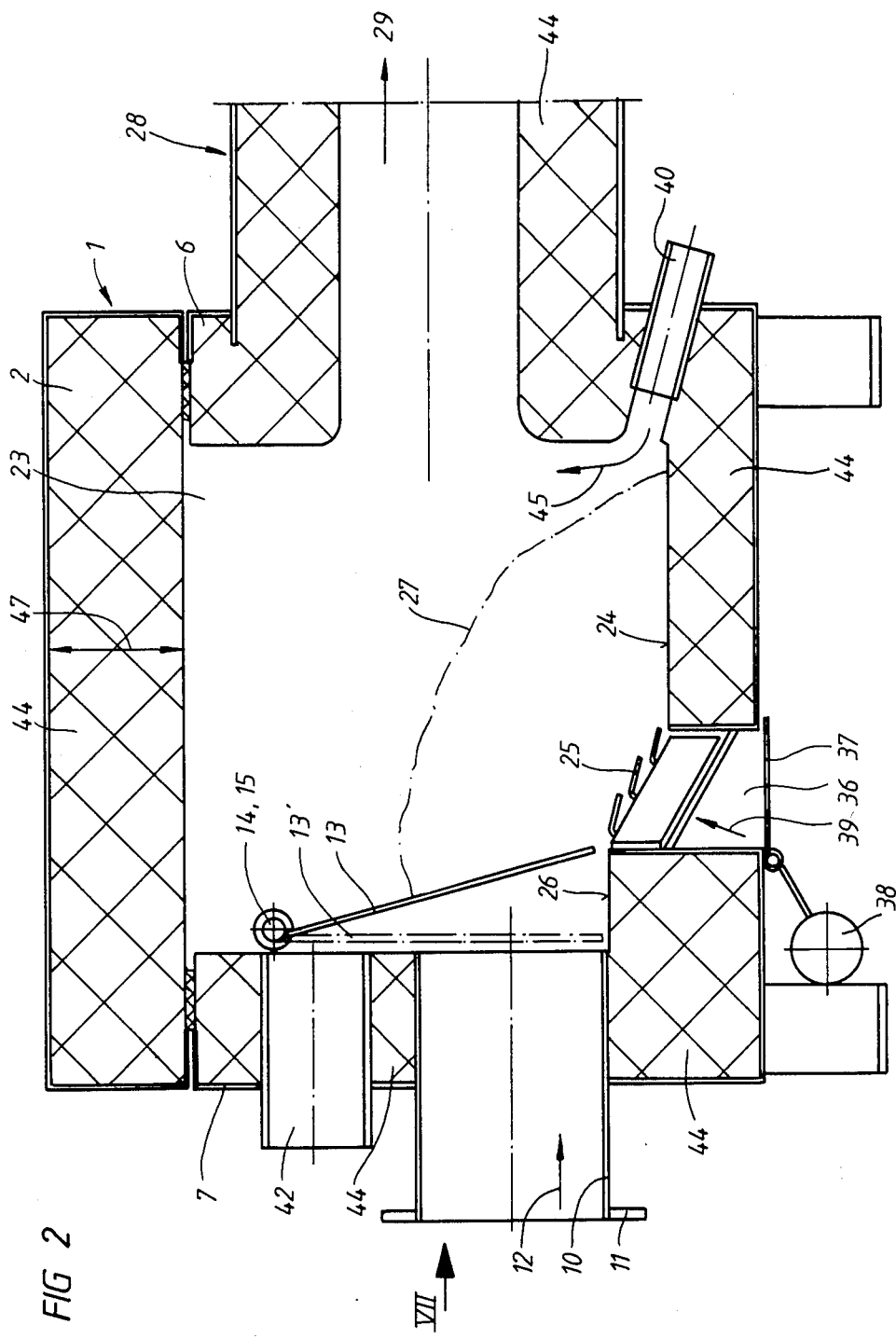
FIG. 2 is a cross-section of the improved solid fuel combustion assembly taken along the lines II—II of FIG. 7.
Figure 4:
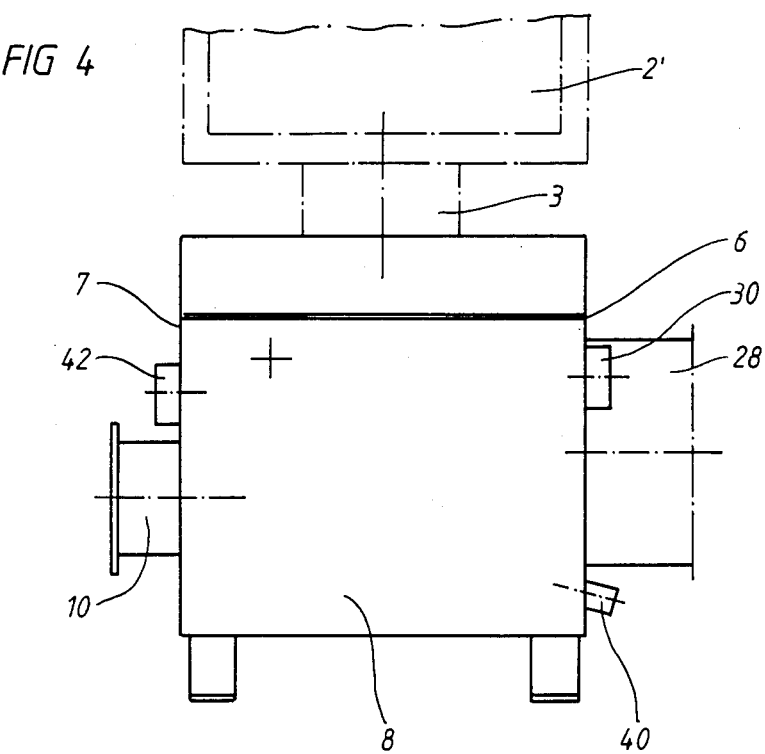
FIG. 4 is a side view of the improved solid fuel combustion assembly.
Figure 6:
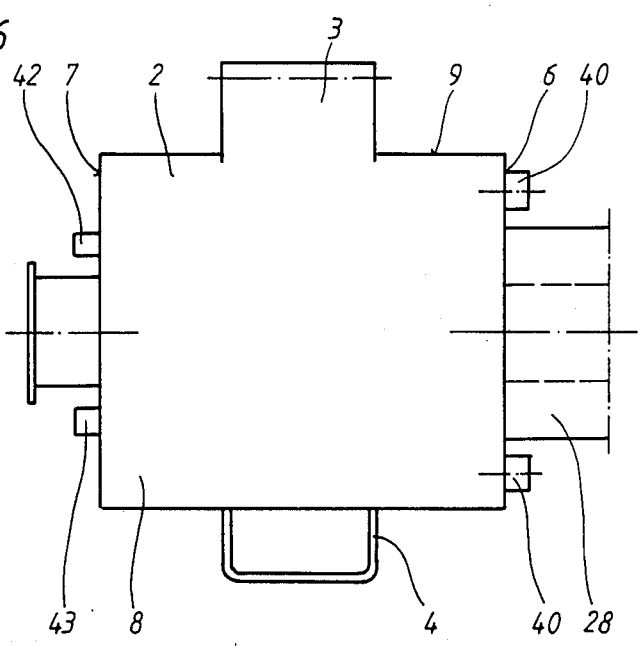
FIG. 6 is a top view of the improved solid fuel combustion assembly.
Figure 5:
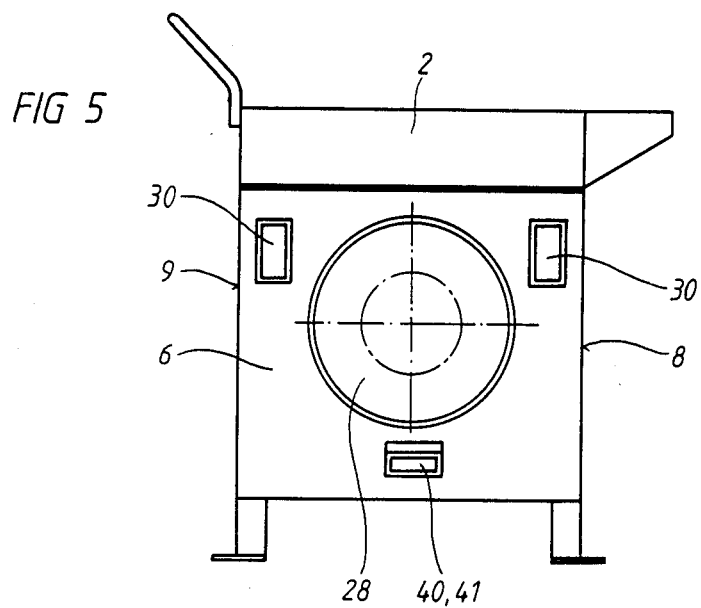
FIG. 5 is an end view of the discharge side of the improved solid fuel combustion assembly.

Referring now to the drawings and particularly to FIGS. 1, 3, 4, 5 and 6, there is illustrated a combustion assembly comprised of a rectangularly-shaped housing 1 and a cover or lid member 2 hingeably mounted thereto by hinge 3. The cover 2 is provided with a handle 4 to facilitate raising (arrow 5) and lowering the cover 2 with respect to the housing 1.

The housing 1 is formed with a front wall 7, a rear wall 6, and side walls 8 and 9 defines a combustion chamber 23 with front and rear bottom wall portions 26 and 24, and the cover 2 referring particularly to FIG. 2. The front wall 7 is provided with a solid fuel feed inlet conduit 10 including a flange member 11 and conduits 42 and 43 disposed above the conduit 10 for introducing secondary combustion supporting fluid medium, such as air. On an interior surface of the front wall 7 overlying the conduit 10, there is disposed a flap member 13 mounted on a shaft member 15 by member 14 for rotation within the housing 1. The rear wall 6 is formed with a discharge conduit 28.

The housing 1 is preferably enclosed by an outer insulating jacket (not shown in detail), e.g. a 100 mm. thick stone jacket encased by a sheet metal jacket. The shaft member 15 extends laterally through a side wall 8 of the housing 1 with control disc members 16 mounted on a portion of the shaft member 15 extending outside of the housing 1, referring particularly to FIGS. 9 and 10. A rod member 21 is mounted to the shaft member 15 on an axis perpendicular thereto and is provided with a tare or compensating weight member 20. The weight member 20 is disposed for selective positioning on the rod 21 as more fully hereinafter discussed. An activator switch 17 is positioned on the housing 1 to effect displacement in the direction indicated by the arrow 19 and thus rotation (arrow 18) of the shaft member 15 and concomitant movement of the flap member 13, as morefully hereinafter discussed.

Between the front bottom wall portion 26 and the rear bottom wall portion 24, there is provided a combustion chamber grill 25 formed in a downwardly-stepped manner therebetween referring particularly to FIG. 2, positioned above an air chamber 36. Beneath the air chamber 36 there is provided a sheet member 37 for enclosing the air chamber 36. The sheet member 37 is mounted for hingeable rotation and in response to tare or control weight 38.

The side walls 8 and 9 are provided with inlet openings 30 and a conduit system for combustion supporting medium and, referring to FIG. 8, are comprised of an upper horizontally-disposed conduit portion 32, an intermediate vertically-disposed conduit portion 34 and a lower horizontally and inwardly-disposed conduit portion 35. The lower conduit portion 35 is in fluid communication with air chamber 36 formed beneath the grill 25.

Disposed in the rear end wall 6 and between the rear bottom wall portion 24 and the rear end wall 6 beneath the discharge conduit 28, there are provided spaced-apart conduits 40 for admitting secondary streams of a combustion supporting medium. The conduits 40 are disposed upwardly toward the combustion chamber 23.

The end walls 6 and 7, side walls 8 and 9, cover 2 and forward and rear bottom wall portions 26 and 24, respectively, are provided with a lining 44 of a high heat capacity material, e.g. lava-clay stone material, which material is poured and provided in a sufficient thickness on the interior surfaces of all walls and/or surfaces to be exposed to combustion temperatures as a result of combustion of the solid fuel to be effected in the combustion chamber 23.

Figure 7:
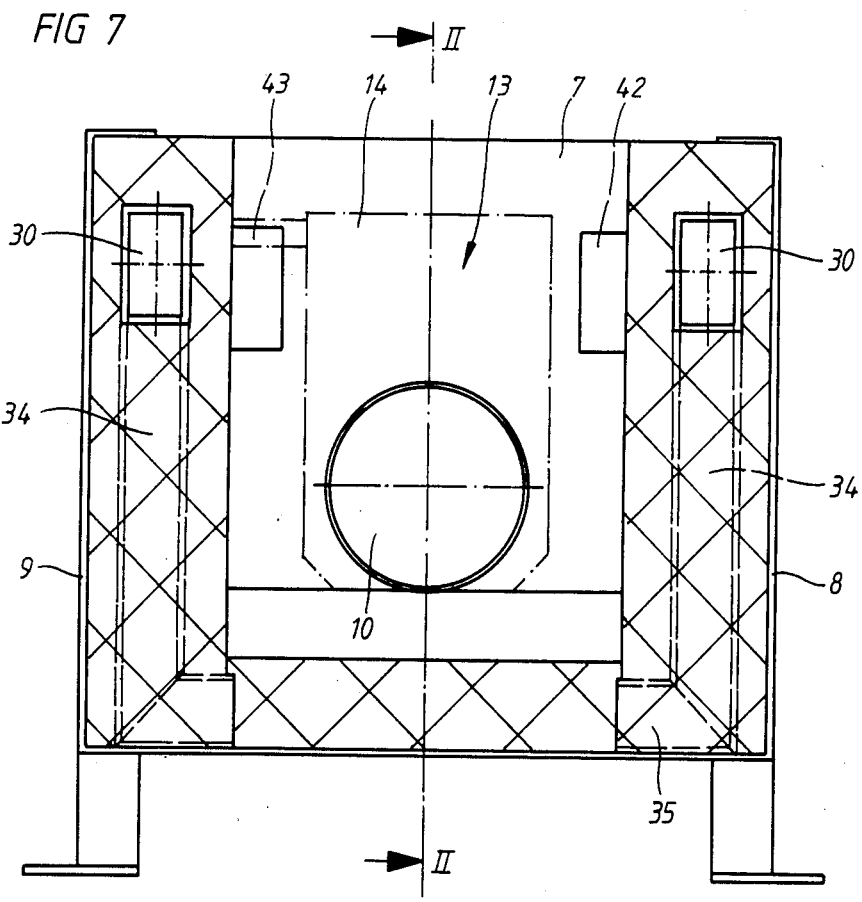
FIG. 7 is a cross-sectional view of the improved solid fuel combustion assembly taken along the lines VII—VII of FIG. 8.

An example of such lava-clay stone material is Lavation TR03 which is a mixture of lava stones and clay supplied in powder form. Such mixture is admixed with water to form a mortar-like consistency with the resulting mortar being poured into all all openings and along the walls of the housing 1 to obtain a liner 44, as particularly illustrated in FIGS. 2 and 7, of a thickness 47 sufficient to provide the desired characteristics of heat capacity. As illustrated in FIG. 2, the thickness 47 is about one-third ($\frac{1}{3}$) the height of the combustion chamber 23 to achieve such desired heat capacity characteristics as well as permit combustion temperatures in the range of from 1000° C. to about 1500° C.

The feed inlet conduit 10 of the combustion assembly 1 is in solids communication via feed screw 53 with storage silo 49 including a stirring arm 51 driven by a motor assembly in solids communication by a bucket wheel feed valve 52 under control of a slide valve 54.

The discharge conduit 28 of the housing 1 of the combustion assembly is in fluid communication with a heat exchanger 46 which in turn is in fluid communication with the suction side of a blower 50 with the discharge side thereof being in communication with the atmosphere.

In operation, a solid fuel material, e.g. wood waste, garden wastes, sewage sludge, or any combustible material stored in the silo 49 is passed through the wheel valve 52 under control of slide valve 54 and thence by screw 53 via the feed inlet conduit 10 into combustion chamber 23 to form an initial charge, illustrated by the dotted line 27. The stirring arm 51, connected to a motor, rotates within the storage silo 49 to facilitate movement of the solid fuel material therein into and through the valve 52 with slide valve 54 controlling the amount of solid fuel material being passed to feed screw 53.

Combustion of the initial charge 27 is effected by opening the cover 2 with ignited material being thrown onto the initial charge to ignite the initial charge. The blower 50 being activated causes a strong flow of combustion supporting medium to be introduced into the combustion chamber 23 with gaseous products of combustion being withdrawn via discharge or outlet conduit 28, as illustrated by the arrow 29, referring particularly to FIG. 2.

Primary combustion supporting medium is passed via parallel primary conduit portions 32, 34 and 35, formed in side walls 8 and 9, as illustrated by arrow 31, referring particularly to FIG. 8, and is preheated during passage through such conduit portions 32, 34 and 35. The thus preheated primary combustion supporting medium is introduced into the air chamber 36 and passed upwardly, as illustrated by the arrow 39, referring again to FIG. 2, through the grill 25. Upon initial ignition of the solid fuel, combustion temperatures of up to about 600° C. are rapidly achieved by the primary flow of combustion medium with further increases to a combustion temperature of from 1000° C. to 1200° C. effected by control of the flow of secondary combustion supporting medium.

Secondary streams of combustion supporting medium are introduced upwardly into the combustion chamber 23 via conduits 40 (in a direction illustrated by arrow 45) and via conduits 42 and 43 ostensibly under the control of the blower 50. Gaseous products of combustion are withdrawn by conduit 28 and passed in indirect heat transfer relationship with a heat transfer fluid in heat exchanger 46 prior to discharge to the atmosphere via the blower 50.

As hereinabove mentioned, the rate of introduction of solid fuel material into the combustion chamber 23 is controlled, in part, by the wheel valve 52 under control of slide valve 54 as to the amount of solid fuel introduced into the feed screw 53 under overall control of switch 17. Additional control is effected by a boiler thermostat operating to effect flow of combustion products through the blower 50.

The flap 13 under the control of a control disc member 16 controls the introduction of the solid fuel material through the feed conduit 10 and thus into the combustion chamber 23. During introduction of solid fuel material into the combustion chamber 23, the flap 13 moves from the position illustrated by the dotted line 13' to the position illustrated by solid line 13, whereupon reaching a "full" status of solids fuel therein deactivates the switch 17 thereby opening the circuits to the motor driving the feed screw 53 as well as the motors driving the arm 51 and the valve 52. As the flap 13 moves downwardly towards the position illustrated by the dotted lines 13', the switch 17 is activated to energize the motors to effect introduction of the solid fuel material as hereinabove discussed. The switch 17 is mounted for adjustable position (as indicated by arrow 19), referring to FIG. 9, for fine adjustment of the operation of the combustion assembly of the present invention.

The solid fuel material is passed from the level of inlet bottom wall portion 26 downwardly to the level of outlet bottom wall portion 24 over the grill 25. The flap 37 disposed beneath the air chamber 36 is maintained in a closed position by the tare weight 38. Upon reaching a predetermined weight of maximum ash level therein, the flap 37 automatically opens to permit discharge of ash therefrom. It will be understood by one skilled in the art that flap 37 may be readily opened by contacting the tare weight 38 in an upward direction to permit any amount of ash to be withdrawn from the air chamber 36 at any time, as desired.

As hereinabove discussed, preheating of the primary streams of combustion supporting medium is effected by passage thereof through the conduit portions 32, 34 and 35 embedded and disposed in the side walls 8 and 9. Additionally, preliminary preheating of primary combustion supporting medium prior to introduction into inlet opening 30 is effected by convection flow about outlet conduit 28 as illustrated by arrow 33, referring to FIG. 8. The conduits 40 and 42 and 43 for secondary streams of combustion supporting medium are provided with damper means for adjusting stepwise flow therethrough, e.g. conduit 40 is provided with damper 41.

Ignition of the solid fuel material and initial combustion temperatures of about 600° C. are readily achieved by flow of primary combustion supporting medium with eventual combustion temperatures of from about 1000° C. to 1200° C. are achieved whereby substantially little or no quantities of fly ash are generated thereby eliminating fly ash removal systems, e.g. electrostatic precipitators or the like. It is noted that the secondary conduits 40 admit combustion supporting medium in an ascending stream (arrow 45) to achieve a funnel like flow to thereby improve efficiency and thus heat transfer to the liner 44, particularly about the outlet conduit 28.

A greater source of secondary combustion supporting medium into the combustion chamber 23 is achieved through secondary conduits 42 and 43 of relatively large cross-section. Introduction of such streams of secondary combustion supporting medium above the level 27 of the charge material results in significant flow of gaseous products of combustion through outlet conduit 28 in the direction indicated by arrow 29, referring particularly to FIG. 2. Additionally, by control of the flow of secondary combustion supporting medium through conduits 40, 42 and 43 practically results in smokeless gaseous products of combustion vented to atmosphere, and at the temperature of combustion such products of combustion are essentially void of any toxic components. It will be noted that flow of solids fuel material and combusting materials through the combustion chamber 23 is enhanced by movement of the material downwardly from the front bottom wall portion 24 to the rear bottom wall portion 26 also in direction of flow of the gaseous products of combustion through the outlet conduit 28.

While the invention has been described in connection with an exemplary embodiment thereof, it will be understood that many modifications will be apparent to those of ordinary skill in the art; and that this application is intended to cover any adaptations or variations thereof. Therefore, it is manifestly intended that this invention be only limited by the claims and the equivalents thereof.

What is claimed:

1. A combustion assembly, which comprises:
a bottom wall, side walls, a front wall, a rear wall and a top wall, said walls forming a combustion chamber, said bottom wall formed of a front bottom wall portion and a spaced-apart rear bottom wall portion disposed in a horizontal plane below a horizontal plane of said front bottom wall portion and including a grill disposed between said front and rear bottom wall portions, inner surfaces of said wall forming said combustion chamber being lined with a fire-resistant material of high heat capacity and including lava stones and clay, said front wall including conduit means for introducing a solid fuel material, said rear wall including a conduit for gaseous products of combustion, conduit means for introducing a primary stream of combustion supporting medium into said combustion chamber via said grill, said conduit means for introducing said primary stream of combustion supporting medium including an upper horizontal conduit portion, a vertical conduit portion and a lower horizontal conduit portion, said conduit portions being disposed in said side walls and imbedded in said fire-resistant material thereof, and conduit means for secondary stream of combustion supporting medium.

2. The combustion assembly as defined in claim 1 wherein said conduit means for said secondary streams are disposed in said front wall.

3. The combustion assembly as defined in claim 2 wherein said conduit means for said secondary streams includes spaced-apart conduit section positioned above said conduit means for introducing said solid fuel material.

4. The combustion assembly as defined in claim 2 wherein said conduit means for said secondary streams includes spaced-apart conduit sections disposed in said rear wall beneath said discharge conduit for upwardly introducing into said combustion chamber said secondary streams of combustion supporting medium.

5. The combustion assembly as defined in claim 4 wherein a lower portion of said conduit means for said solid fuel material is on a plane of said front bottom wall portion and wherein said conduit sections disposed on said rear wall includes a lower portion in a plane of said rear bottom wall portion.

6. The combustion assembly as defined in claim 1 and further including a feed inlet flap hingeably mounted to a shaft over said conduit means for introducing solid full material into said combustion chamber and a solid fuel feed screw for introducing solid fuel material into said conduit means for said solid fuel material, and wherein to said shaft is mounted a control disc memmber for opening and closing an activator switch operatively associated with a motor for said solid fuel feed screw.

7. The combustion assembly as defined in claim 1 wherein said conduit for said gaseous products of combustion is lined with like fire-resistant material of high heat capacity.

8. The combustion assembly as defined in claim 1 wherein the ratio of the thickness of said fire-resistant material to height of said combustion chamber is about 1:3.

9. The combustion assembly as defined in claim 1 and further including a blower with a suction side thereof in fluid communication with said conduit for gaseous products of combustion.

* * * * *

UNITED STATES PATENT AND TRADEMARK OFFICE
CERTIFICATE OF CORRECTION

PATENT NO. :   4,628,829
DATED      :   December 16, 1986
INVENTOR(S) :  Günter Klais It is certified that error appears in the above-identified patent and that said Letters Patent is hereby corrected as shown below:

On the Title Page:

The Inventor's name should read -- Günter Klais --, not "Günter Klaus" (all occurrences).

Signed and Sealed this

Seventeenth Day of March, 1987

Attest:

DONALD J. QUIGG

Attesting Officer

Commissioner of Patents and Trademarks